UNITED STATES PATENT OFFICE.

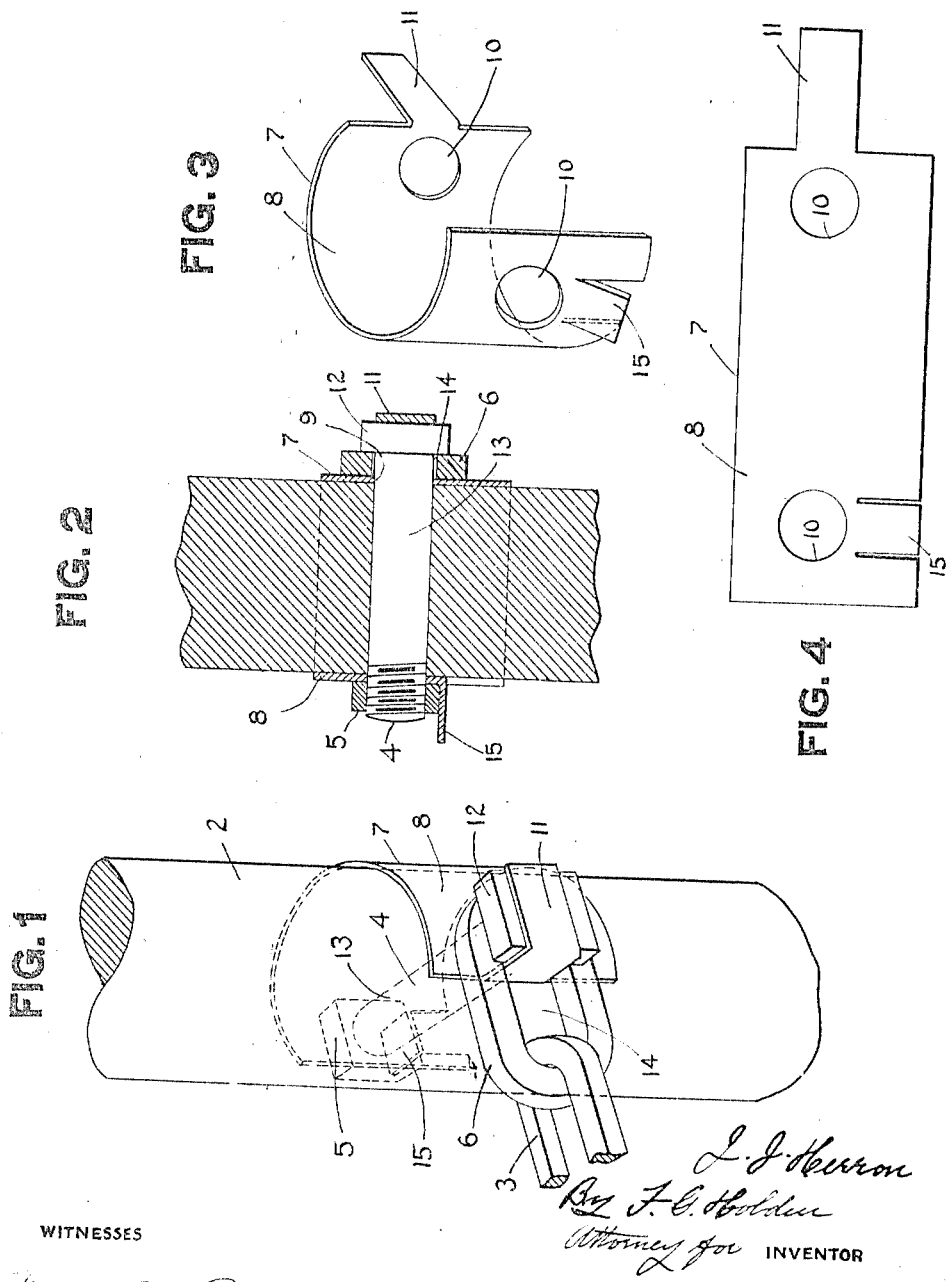

JAMES JOSEPH HERRON, OF PITTSBURGH, PENNSYLVANIA.

NUT AND BOLT LOCK.

1,073,755.  Specification of Letters Patent.  Patented Sept. 23, 1913.

Application filed May 3, 1913. Serial No. 765,406.

*To all whom it may concern:*

Be it known that I, JAMES JOSEPH HERRON, a citizen of the United States of America, residing at Pittsburgh, in the county of Allegheny and State of Pennsylvania, have invented new and useful Improvements in Nut and Bolt Locks, of which the following is a full, clear, and exact description, reference being had to the accompanying drawings, which form part of this specification.

This invention is an improved form of locking means, whereby a nut or bolt may be securely locked against accidental displacement or unscrewing, and finds particular adaption in the embodiment of a device for locking the nut and bolt employed in the connection of the brake chain with the brake staff or similar member in railway equipment. As such a device, it not only aims to provide a lock as above described, but it also affords an additional advantage in that it holds the bolt against longitudinal shifting under the operative stresses and strains of traffic, while at the same time providing for ready removal and renewal of the brake chain without necessitating the removal of the brake staff, should the chain become broken.

While I have shown my invention as embodied in a patentable form of lock, it will be premised that changes will occur to those skilled in the art, which would not be a departure from the invention as defined in the appended claims.

I will now describe my invention, referring to the accompanying drawings, so that others skilled in the art to which it appertains may understand and construct the same, it being premised that various changes may be made in the structure shown without departing from my invention.

Figure 1 is a perspective view showing my invention as embodied in a fastening device for the brake chain and staff of railway equipment; Fig. 2 is a vertical sectional view thereof, longitudinally of the bolt; Fig. 3 is a perspective view of the locking member; and Fig. 4 is a plan view of the flat plate or sheet from which the member 3 is preferably formed.

The reference numeral 2 indicates a section of an ordinary brake staff forming an element of the braking apparatus of railway equipment. To the staff 2 is usually secured the brake chain 3 leading from the brake beam or shoe of such apparatus, (not shown).

The numeral 4 indicates a bolt passing transversally through the staff and being provided with an ordinary nut 5. This bolt passes through the securing member or link 6 of the chain 3, but before application of the bolt, I apply the locking member 7 which comprises a sheet like member 8, preferably formed of sheet metal or plate, and bent or shaped to conform to the curvature of the brake staff. This member 8 preferably so encircles or extends around the brake staff as to overlie the opening 9 in the brake staff (see Fig. 2), and it is provided at each terminal with the bolt openings or passageways 10 which lie in registry with the bolt opening 9 when said member 8 is in position.

In the application of the device, the member 8 is placed in position and the bolt 4 passes through the member 6 and through the brake staff, and is provided with the nut 5, which is then tightened in the usual manner for adjustment or tightening of bolt 4, a tongue 11, carried by one end of the member 8 is bent so as to assume a position preferably flat against the head 12 of the bolt 4. This member or tongue 11 is also preferably of such length as to cause it to overlap the head, as clearly shown in Fig. 1, to prevent longitudinal displacement or accidental withdrawal of the bolt by the nut 5 working loose, and leaving the bolt shank 13. The tongue 11 may be formed at a suitable point on the member 8, but is preferably positioned so as to pass through the opening 14 in the member 6 of the brake chain. The nut 5 is also locked after being applied by means of a similar tongue member 15 which is bent upwardly over the nut 5 as clearly shown in Figs. 1 and 2.

The advantages of my invention will be readily seen in that I provide a locking device which is of a duplex character, although formed in only one piece, and a lock is also provided which absolutely insures locking of the bolt and nut against loosening, thereby greatly lessening the liability to injury resulting from disconnecting or working loose of parts of the equipment.

Having thus described my invention, what I claim and desire to secure by Letters Patent is:

1. In a lock of the character described, the combination with a bolt and nut, of a sheet